US012676909B2

(12) United States Patent (10) Patent No.: US 12,676,909 B2
Patel et al. (45) Date of Patent: Jul. 7, 2026

(54) SYSTEMS AND METHODS FOR TRANSMITTING PERIODIC DISCONNECT PEER REQUESTS BASED ON GRACEFUL CONNECTION CYCLING

(71) Applicant: Verizon Patent and Licensing Inc., Basking Ridge, NJ (US)

(72) Inventors: Taral Patel, Piscataway, NJ (US); Michael Trupia, Roseland, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 271 days.

(21) Appl. No.: 18/654,511

(22) Filed: May 3, 2024

(65) Prior Publication Data

US 2025/0343834 A1    Nov. 6, 2025

(51) Int. Cl.
H04L 67/104 (2022.01)
H04L 67/1004 (2022.01)
(52) U.S. Cl.
CPC ...... H04L 67/1048 (2013.01); H04L 67/1004 (2013.01)

(58) Field of Classification Search
CPC ........................ H04L 67/1048; H04L 67/1004
See application file for complete search history.

(56) References Cited

U.S. PATENT DOCUMENTS

| | | | | |
|---|---|---|---|---|
| 7,808,998 B2 * | 10/2010 | Stewart | .................. | H04L 69/16 370/503 |
| 2008/0205288 A1 * | 8/2008 | Herzog | ............... | H04L 61/2553 370/252 |
| 2013/0151714 A1 * | 6/2013 | Ralph | ................... | H04W 76/25 709/227 |
| 2020/0267190 A1 * | 8/2020 | Dröse | ................. | H04L 43/0858 |

* cited by examiner

*Primary Examiner* — Benjamin M Thieu

(57) ABSTRACT

In some implementations, a network device may establish a connection between a client and a server instance associated with a service. The network device may identify that a timer for transmitting a periodic disconnect peer request has expired. The network device may transmit the periodic disconnect peer request to the client based on an expiry of the timer, wherein the periodic disconnect peer request includes a value for graceful connection cycling, and the graceful connection cycling is to be applied to the connection based on the periodic disconnect peer request.

20 Claims, 5 Drawing Sheets

500

510 — Establish, by a network device, a connection between a client and a server instance associated with a service 520 — Identify, by the network device, that a timer for transmitting a periodic disconnect peer request has expired 530 — Transmit, by the network device to the client based on an expiry of the timer, the periodic disconnect peer request that includes a value for graceful connection cycling

100

300

400

Bus
410

Processor
420

Memory
430

Input
Component
440

Output
Component
450

Communication
Component
460

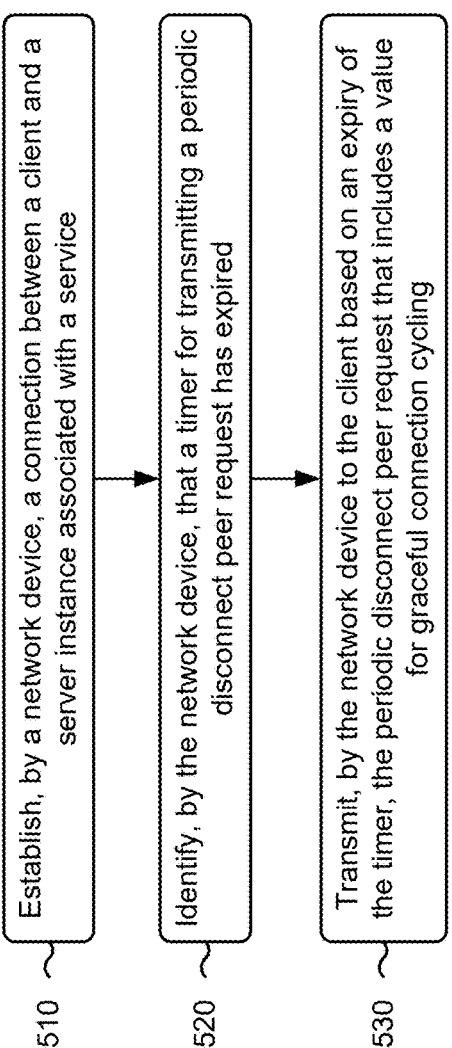

500

510 Establish, by a network device, a connection between a client and a server instance associated with a service 520 Identify, by the network device, that a timer for transmitting a periodic disconnect peer request has expired 530 Transmit, by the network device to the client based on an expiry of the timer, the periodic disconnect peer request that includes a value for graceful connection cycling

FIG. 5

SYSTEMS AND METHODS FOR TRANSMITTING PERIODIC DISCONNECT PEER REQUESTS BASED ON GRACEFUL CONNECTION CYCLING

BACKGROUND

Communication systems are widely deployed to provide various telecommunication services such as telephony, video, data, messaging, and broadcasts. A network may include one or more network nodes that support communication for wireless communication devices.

BRIEF DESCRIPTION OF THE DRAWINGS

FIG. 5 is a flowchart of an example process associated with transmitting periodic disconnect peer requests based on graceful connection cycling.

DETAILED DESCRIPTION OF EXAMPLE EMBODIMENTS

Figure 1:
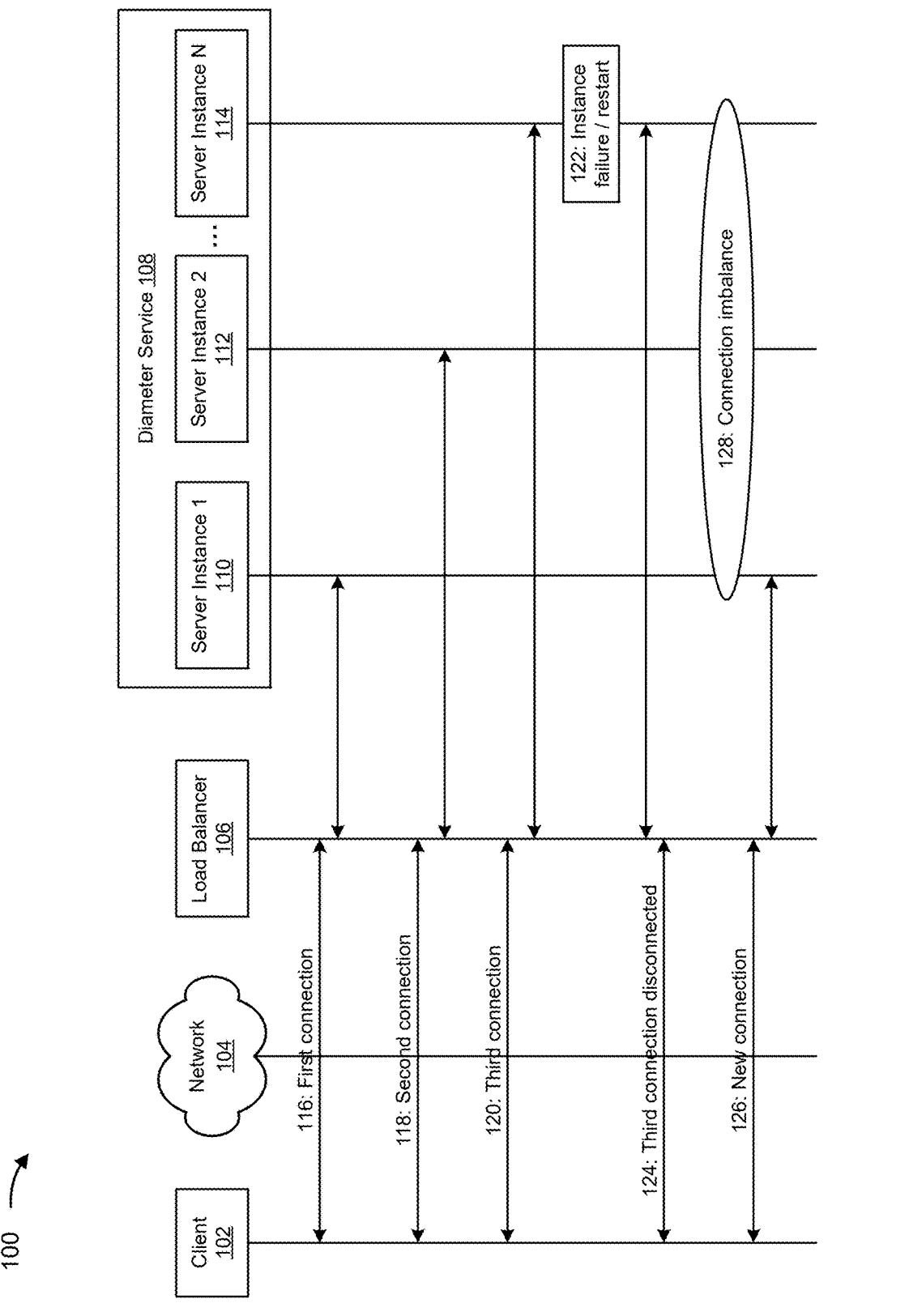
FIG. 1 is a diagram of an example associated with connections to a distributed diameter service.

The following detailed description of example implementations refers to the accompanying drawings. The same reference numbers in different drawings may identify the same or similar elements.

A client may open a connection towards a diameter service. The connection may be an outbound connection. The connection may be a diameter connection or a transmission control protocol (TCP) connection. The diameter service may be a distributed diameter service that includes a plurality of server instances. The diameter service may be based on a micro service architecture, where each server instance may be an instance of a micro service.

A load balancer (e.g., a TCP load balancer) may support a one-to-one mapping. When the client opens one connection, the load balancer may open one connection. When the client opens three connections, the load balancer may open three connections, and the load balancer may attempt to load balance the three connections among the plurality of server instances associated with the diameter service. Once a connection is established, the connection may remain open for an indefinite period of time until a corresponding server instance breaks or needs to reboot.

Over a period of time, some server instances may need to be rebooted because the micro service is variable and a number of server instances used to support the micro service may be variable. Some server instances may need to reboot and those server instances may lose connections with the client. For example, a particular server instance may be associated with an instance failure and need to restart, and in that process, that server instance may lose a connection with the client. New connections may be unevenly distributed among remaining server instances, which may result in a connection imbalance. A number of connection requests that are sent to one particular server instance may be greater than a number of connection requests that are sent to other remaining server instances, which may contribute to the connection imbalance. When a connection breaks, the connection may be redistributed to a new server instance, but at that point, the connection may stick to the new server instance for an indefinite period of time (e.g., until the new server instance breaks or needs to reboot). The connection imbalance may increase a likelihood of a particular server instance being overloaded, while other server instances may still have available resources that are not being utilized, which may degrade an overall system performance.

In some implementations, connections between the client and different server instances of the diameter service may be periodically disconnected. Connections across every server instance may be periodically disconnected and the connections may be reestablished, such that the load balancer may be able to evenly distribute the connections across the different server instances of the diameter service. Connections may be cycled across the different server instances. By periodically disconnecting and reestablishing the connections, the connections may not be stuck to one particular server instance. As a result, a server instance failure and restart may not lead to an imbalance of connections over a period of time, thereby resulting in an overall improved system performance.

FIG. 1 is a diagram of an example 100 associated with connections to a distributed diameter service. As shown in FIG. 1, example 100 includes a client 102, a network 104, a load balancer 106, and a diameter service 108. The network 104 may be a local area network (LAN) or a wide area network (WAN). The diameter service 108 may include a plurality of server instances, such as a first server instance (Server Instance 1) 110, a second server instance 112 (Server Instance 2), and a third server instance 114 (Server Instance N).

The client 102 may be an entity that is outside of the load balancer 106. For example, the client 102 may be a call session control function (CSCF). The load balancer may be a TCP load balancer. The diameter service 108 may be associated with a micro service architecture.

As shown by reference number 116, the client 102 may establish a first connection (e.g., diameter connection or TCP connection) with the load balancer 106, and the load balancer 106 may assign the first connection to the first server instance 110. As shown by reference number 118, the client 102 may establish a second connection with the load balancer 106, and the load balancer 106 may assign the second connection to the second server instance 112. As shown by reference number 120, the client 102 may establish a third connection with the load balancer 106, and the load balancer 106 may assign the third connection to the third server instance 114. As shown by reference number 122, the third server instance 114 may be associated with an instance failure and may need to restart. As shown by reference number 124, the third connection may become disconnected, which may be based on the instance failure and the need to restart. As shown by reference number 126, the client 102 may establish a new connection with the load balancer 106, and the load balancer 106 may assign the new connection to the first server instance 110. As shown by reference number 128, the new connection may result in a connection imbalance among remaining server instances of the diameter service 108. As a result, connections to the distributed diameter service, which may be behind the load balancer 106, may not be balanced across individual diameter server instances, which may occur due to controllable events (e.g., scheduled maintenance) or uncontrollable events (e.g., instance crashes).

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
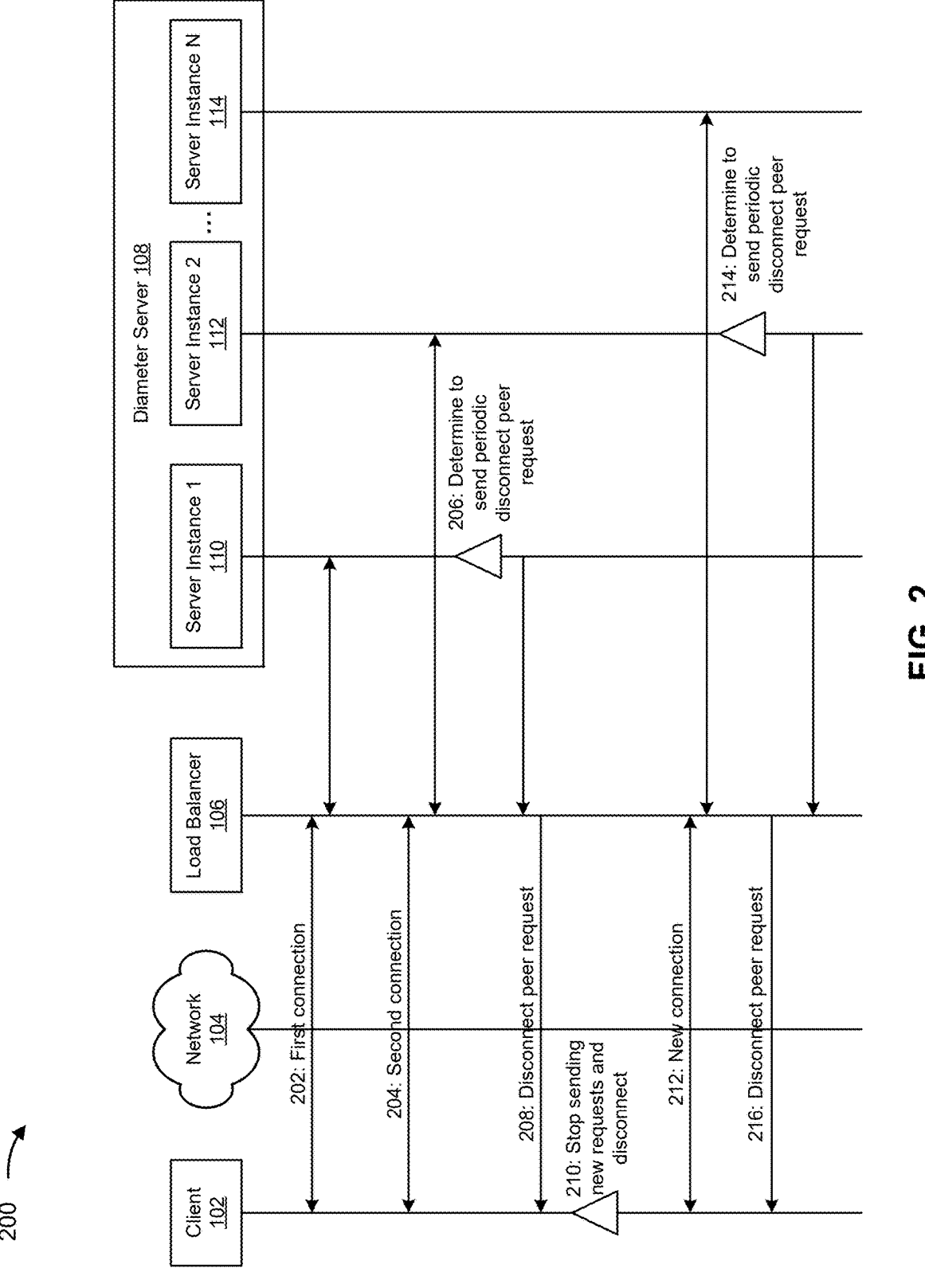
FIG. 2 is a diagram of an example associated with transmitting periodic disconnect peer requests based on graceful connection cycling.

FIG. 2 is a diagram of an example 200 associated with transmitting periodic disconnect peer requests based on graceful connection cycling. As shown in FIG. 2, example 200 includes a client 102, a network 104, a load balancer 106, and a diameter service 108. The network 104 may be a LAN or a WAN. The diameter service 108 may include a plurality of server instances, such as a first server instance (Server Instance 1) 110, a second server instance 112 (Server Instance 2), and a third server instance 114 (Server Instance N). The plurality of server instances may include application server instances.

As shown by reference number 202, the client 102 may establish a first connection (e.g., diameter connection or TCP connection) with the load balancer 106, and the load balancer 106 may assign the first connection to the first server instance 110. As shown by reference number 204, the client 102 may establish a second connection with the load balancer 106, and the load balancer 106 may assign the second connection to the second server instance 112.

As shown by reference number 206, the first server instance 110 may determine to send a periodic disconnect peer request. For example, the first server instance 110 may determine to send the periodic disconnect peer request based on an expiry of a timer. As shown by reference number 208, the first server instance 110 may transmit the periodic disconnect peer request to the client 102. The periodic disconnect peer request may indicate a disconnect cause attribute value pair (AVP), which may be set to a cause value that is associated with a graceful connection cycling. The periodic disconnect peer request may also indicate a last hop-by-hop identifier (ID) AVP, which may include a value of a latest hop-by-hop ID (chronologically) received from the client 102.

As shown by reference number 210, the client 102 may receive the periodic disconnect peer request, and in response, the client 102 may stop sending new requests over the first connection (e.g., an existing connection) with the first server instance 110. The client 102 may wait for all responses to be received from the first server instance 110, and then the client 102 may gracefully disconnect from the first server instance 110. The client 102 may gracefully terminate the first connection with the first server instance 110. The client 102 may asynchronously open a new connection and continue to process requests. As shown by reference number 212, the client 102 may establish the new connection with the load balancer 106, and the load balancer 106 may assign the new connection to the third server instance 114.

As shown by reference number 214, the second server instance 112 may determine to send a periodic disconnect peer request. For example, the second server instance 112 may determine to send the periodic disconnect peer request based on an expiry of a timer. As shown by reference number 216, the second server instance 112 may transmit the periodic disconnect peer request to the client 102. The periodic disconnect peer request may indicate a disconnect cause AVP, which may be set to a cause value that is associated with a graceful connection cycling. The periodic disconnect peer request may also indicate a last hop-by-hop ID AVP. As shown by reference number 216, the client 102 may receive the periodic disconnect peer request, and in response, the client 102 may stop sending new requests over the second connection with the second server instance 112. The client 102 may wait for all responses to be received from the second server instance 112, and then the client 102 may gracefully disconnect from the second server instance 112.

In some implementations, in order for a connection to not stick to a particular server instance, such as the first server instance 110, the connection may be gracefully disconnected, such that a graceful disconnection of the connection may not introduce a service impact. In order for the connection to be gracefully disconnected, certain parameters may be signaled (e.g., via diameter messaging) at an application layer. The graceful disconnection may be based on the periodic disconnect peer request, which may be transmitted from the first server instance 110 to the client 102. The periodic disconnect peer request may indicate a disconnect cause AVP, which may be set to a cause value that is associated with a graceful connection cycling. For example, the disconnect cause AVP (code 273) may be set to a cause value of 3 to indicate the graceful connection cycling. The client 102, after receiving the periodic disconnect peer request with the disconnect cause AVP that is set to the graceful connection cycling, may need to perform various functions to facilitate the graceful disconnection. The periodic disconnect peer request may also indicate a last hop-by-hop ID AVP, which may include a value of a latest hop-by-hop ID (chronologically) received from the client 102. A new cause value of graceful connection cycling in the disconnect cause AVP and a new last hop-by-hop ID AVP may allow for an application layer connection between the client 102 and the first server instance 110 to be gracefully terminated without introducing service impact. Further, the load balancer 106 may be used to keep connections balanced across the plurality of server instances.

In some implementations, the first server instance 110 may periodically (e.g., configurable on a server side) transmit the periodic disconnect peer request with a disconnect cause=3 (GRACEFUL_CONNECTION_CYCLING) to the client 102. The first server instance 110 may additionally include a diameter AVP LAST-HOP-BY-HOP-ID, which may include the last hop-by-hop ID that the first server instance 110 received from the client 102. The first server instance 110 may include the diameter AVP LAST-HOP-BY-HOP-ID in order to indicate, to the client 102, that this is a last request for which the first server instance 110 will provide a response. The client 102, after receiving the periodic disconnect peer request, may stop sending any new requests to the first server instance 110 over the first connection.

In some implementations, the first server instance 110 may start a configurable timer to complete processing of all inflight requests from the client 102, up to and including the last hop-by-hop ID that was transmitted by the first server instance 110 to the client 102. The first server instance 110 may run the timer on its end (e.g., the timer may run at the first server instance 110). A configurable timer logic may be a static value taken from an end user and a pseudorandom number autogenerated by the first server instance 110 at run time in order to randomize the time at which the periodic disconnect peer request is sent by the first server instance 110. After the timer expires, the first server instance 110 may originate its own transport layer disconnection, unless the first server instance 110 has received a transport layer disconnection from the client 102. The client 102 may open the new connection over a new transport layer connection, asynchronously, with the third server instance 114 to continue to process new requests. For any requests that were originated by the client 102 at the same time the periodic disconnect peer request was generated by the first server instance 110 and sent towards the client 102, the client 102 may include logic to handle timeouts/response failures to retry over the new connection. In other words, when an inflight request is transmitted by the client 102 after the periodic disconnect peer request is transmitted by the first server instance 110, the client 102 may retry the request on another server instance, such as the third server instance 114.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
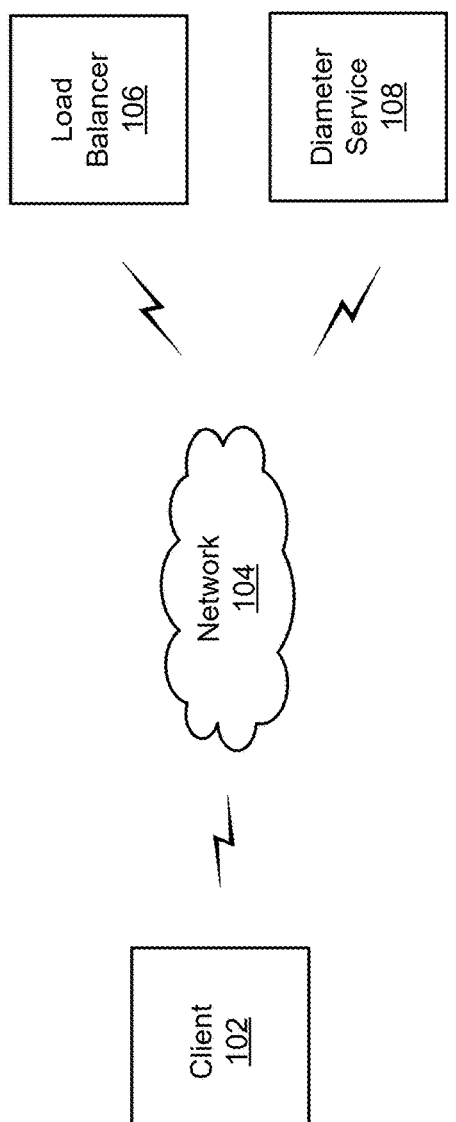
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a client 102, a network 104, a load balancer 106, and a diameter service 108. Devices of environment 300 may interconnect via wired connections, wireless connections, or a combination of wired and wireless connections.

The client 102 may include one or more devices capable of receiving, generating, storing, processing, and/or providing information associated with transmitting periodic disconnect peer requests based on graceful connection cycling, as described elsewhere herein. The client 102 may include a communication device, a computing device, and/or a network device. The client 102 may be associated with a service, such as a micro service.

The network 104 may include one or more wired and/or wireless networks. For example, the network 104 may include a cellular network (e.g., a 5G network, a 4G network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 104 enables communication among the devices of environment 300.

The load balancer 106 may include one or more devices capable of receiving, processing, storing, routing, and/or providing traffic (e.g., a packet and/or other information or metadata) in a manner described herein. The load balancer 106 may provide a routing capability, and may incorporate an ingress router, an egress router, a provider router (e.g., a provider edge router or a provider core router), a virtual router, or another type of router. In some implementations, the load balancer 106 may be a physical device implemented within a housing, such as a chassis. In some implementations, the load balancer 106 may be a virtual device implemented by one or more computing devices of a cloud computing environment or a data center. In some implementations, a group of load balancers 106 may be a group of data center nodes that are used to route traffic flow through a network.

The diameter service 108 may include one or more devices capable of receiving, generating, storing, processing, providing, and/or routing information associated with transmitting periodic disconnect peer requests based on graceful connection cycling, as described elsewhere herein. The diameter service 108 may include a communication device and/or a computing device. For example, the diameter service 108 may include a server (or server instances), such as an application server, a client server, a web server, a database server, a host server, a proxy server, a virtual server (e.g., executing on computing hardware), or a server in a cloud computing system. In some implementations, the diameter service 108 may include computing hardware used in a cloud computing environment.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
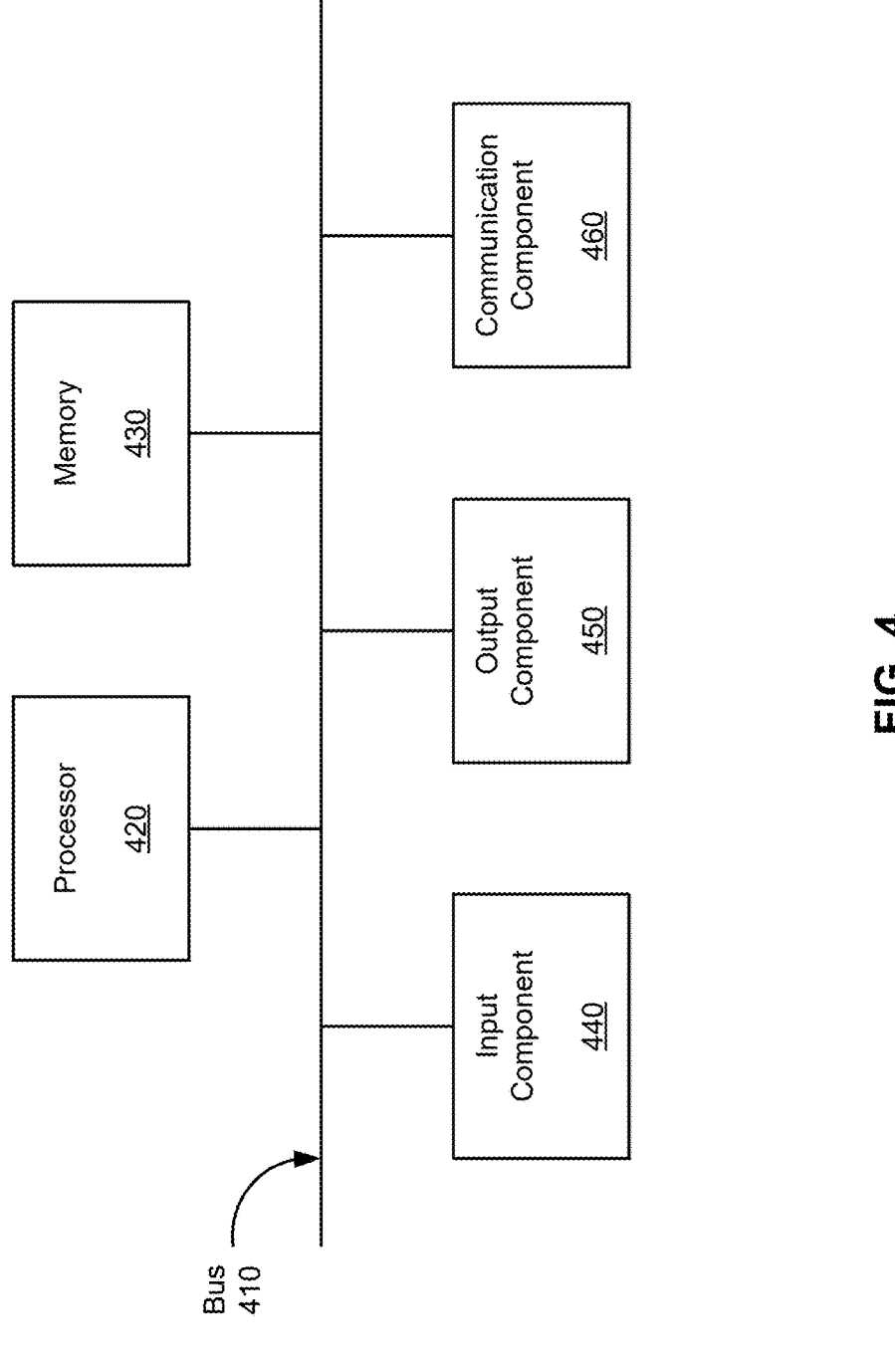
FIG. 4 is a diagram of example components of one or more devices of FIG. 3.

FIG. 4 is a diagram of example components of a device 400 associated with transmitting periodic disconnect peer requests based on graceful connection cycling. The device 400 may correspond to a network device, such as a load balancer (e.g., load balancer 106). Alternatively, the network device may be a client (e.g., client 102) or a diameter service (e.g., diameter service 108). In some implementations, the network device may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory).

The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hard-wired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 associated with transmitting periodic disconnect peer requests based on graceful connection cycling. In some implementations, one or more process blocks of FIG. 5 may be performed by a network device, such as a load balancer (e.g., load balancer 106). Alternatively, the network device may be a client (e.g., client 102) or a diameter service (e.g., diameter service 108). In some implementations, one or more process blocks of FIG. 5 may be performed by another device or a group of devices separate from or including the device. Additionally, or alternatively, one or more process blocks of FIG. 5 may be performed by one or more components of device 400, such as processor 420, memory 430, input component 440, output component 450, and/or communication component 360.

As shown in FIG. 5, process 500 may include establishing, by the network device, a connection between a client and a server instance associated with a service (block 510). The connection may be a diameter connection based on a diameter protocol. The connection may be a TCP connection based on a TCP protocol. The network device may provide a load balancing functionality.

As shown in FIG. 5, process 500 may include identifying, by the network device, that a timer for transmitting a periodic disconnect peer request has expired (block 520). The timer may define a time period for requests from the client to be processed, including a request associated with a last hop-by-hop identifier. The timer may be configurable based on a static value associated with an end user and a pseudorandom number automatically generated by the server instance at run time.

As shown in FIG. 5, process 500 may include transmitting, by the network device, the periodic disconnect peer request to the client based on an expiry of the timer, wherein the periodic disconnect peer request includes a value for graceful connection cycling, and the graceful connection cycling is to be applied to the connection based on the periodic disconnect peer request (block 530). The periodic disconnect peer request may include a disconnect cause AVP, and the disconnect cause AVP may include the value for the graceful connection cycling. The periodic disconnect peer request may include a last hop-by-hop ID AVP, and the last hop-by-hop ID AVP may include a value of a last hop-by-hop ID received by the server instance from the client. The value of the last hop-by-hop ID may indicate a last request from the client for which a response is provided by the server instance.

In some implementations, the connection may be a first connection and the server instance may be a first server instance. The network device may stop a relaying of requests from the client to the first server instance after the periodic disconnect peer request is transmitted. The network device may establish, after the periodic disconnect peer request is transmitted, a second connection between the client and a second server instance, where a request originated by the client after the periodic disconnect peer request is transmitted may be handled by the second connection.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code-it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used.

Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

establishing, by a network device, a connection between a client and a server instance associated with a service;

identifying, by the network device, that a timer for transmitting a periodic disconnect peer request has expired; and transmitting, by the network device, the periodic disconnect peer request to the client based on an expiry of the timer, wherein the periodic disconnect peer request includes a value for graceful connection cycling, and the graceful connection cycling is to be applied to the connection based on the periodic disconnect peer request.

2. The method of claim 1, wherein the periodic disconnect peer request includes a disconnect cause attribute value pair (AVP), and the disconnect cause AVP includes the value for the graceful connection cycling.

3. The method of claim 1, wherein the periodic disconnect peer request includes a last hop-by-hop identifier (ID) attribute value pair (AVP), and the last hop-by-hop ID AVP includes a value of a last hop-by-hop ID received by the server instance from the client.

4. The method of claim 3, wherein the value of the last hop-by-hop ID indicates a last request from the client for which a response is provided by the server instance.

5. The method of claim 1, further comprising:

stopping, by the network device, a relaying of requests from the client to the server instance after the periodic disconnect peer request is transmitted.

6. The method of claim 1, wherein the timer defines a time period for requests from the client to be processed, including a request associated with a last hop-by-hop identifier.

7. The method of claim 1, wherein the timer is configurable based on a static value associated with an end user and a pseudorandom number automatically generated by the server instance at run time.

8. The method of claim 1, wherein the connection is a first connection and the server instance is a first server instance, and further comprising:

establishing, by the network device and after transmitting the periodic disconnect peer request, a second connection between the client and a second server instance, wherein a request originated by the client after the periodic disconnect peer request is transmitted is handled by the second connection.

9. The method of claim 1, wherein the connection is a diameter connection based on a diameter protocol.

10. The method of claim 1, wherein the connection is a transmission control protocol (TCP) connection based on a TCP protocol.

11. The method of claim 1, wherein the network device provides a load balancing functionality.

12. A network device, comprising:
one or more processors configured to:
  establish a connection between a client and a server instance associated with a service;
  identify that a timer for transmitting a periodic disconnect peer request has expired; and
  transmit the periodic disconnect peer request to the client based on an expiry of the timer, wherein the periodic disconnect peer request includes a value for graceful connection cycling, and the graceful connection cycling is to be applied to the connection based on the periodic disconnect peer request.

13. The network device of claim 12, wherein:
the periodic disconnect peer request includes a disconnect cause attribute value pair (AVP), and the disconnect cause AVP includes the value for the graceful connection cycling; and
the periodic disconnect peer request includes a last hop-by-hop identifier (ID) AVP, the last hop-by-hop ID AVP includes a value of a last hop-by-hop ID received by the server instance from the client, and the value of the last hop-by-hop ID indicates a last request from the client for which a response is provided by the server instance.

14. The network device of claim 12, wherein:
the timer defines a time period for requests from the client to be processed, including a request associated with a last hop-by-hop identifier; and
the timer is configurable based on a static value associated with an end user and a pseudorandom number automatically generated by the server instance at run time.

15. The network device of claim 12, wherein the connection is a first connection and the server instance is a first server instance, and the one or more processors are further configured to:
  stop a relaying of requests from the client to the first server instance after the periodic disconnect peer request is transmitted; and
  establish, after the periodic disconnect peer request is transmitted, a second connection between the client and a second server instance, wherein a request originated by the client after the periodic disconnect peer request is transmitted is handled by the second connection.

16. The network device of claim 12, wherein the connection is a diameter connection, and the network device provides a load balancing functionality.

17. A non-transitory computer-readable medium storing a set of instructions, the set of instructions comprising:
  one or more instructions that, when executed by one or more processors of a network device, cause the network device to:
    establish a connection between a client and a server instance associated with a service;
    identify that a timer for transmitting a periodic disconnect peer request has expired; and
    transmit the periodic disconnect peer request to the client based on an expiry of the timer, wherein the periodic disconnect peer request includes a value for graceful connection cycling, and the graceful connection cycling is to be applied to the connection based on the periodic disconnect peer request.

18. The non-transitory computer-readable medium of claim 17, wherein:
the periodic disconnect peer request includes a disconnect cause attribute value pair (AVP), and the disconnect cause AVP includes the value for the graceful connection cycling; and
the periodic disconnect peer request includes a last hop-by-hop identifier (ID) AVP, the last hop-by-hop ID AVP includes a value of a last hop-by-hop ID received by the server instance from the client, and the value of the last hop-by-hop ID indicates a last request from the client for which a response is provided by the server instance.

19. The non-transitory computer-readable medium of claim 17, wherein:
the timer defines a time period for requests from the client to be processed, including a request associated with a last hop-by-hop identifier; and
the timer is configurable based on a static value associated with an end user and a pseudorandom number automatically generated by the server instance at run time.

20. The non-transitory computer-readable medium of claim 17, wherein the connection is a first connection and the server instance is a first server instance, and the one or more instructions, when executed by the one or more processors, further cause the network device to:
  stop a relaying of requests from the client to the first server instance after the periodic disconnect peer request is transmitted; and
  establish, after the periodic disconnect peer request is transmitted, a second connection between the client and a second server instance, wherein a request originated by the client after the periodic disconnect peer request is transmitted is handled by the second connection.

* * * * *